(12) United States Patent
Wasylewski et al.

(10) Patent No.: US 7,004,665 B2
(45) Date of Patent: Feb. 28, 2006

(54) SNAP TOGETHER AUTOMOTIVE COUPLER

(75) Inventors: Neil Alan Wasylewski, Farmington Hills, MI (US); Gregory Paul Kiselis, Livonia, MI (US); Paul Eugene Beshears, Jr., Plymouth, MI (US); David Robert Helebrant, Taylor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 0 days.

(21) Appl. No.: 10/290,698

(22) Filed: Nov. 8, 2002

(65) Prior Publication Data

US 2004/0091306 A1    May 13, 2004

(51) Int. Cl.
*F16C 11/00* (2006.01)
(52) U.S. Cl. ............... 403/135; 403/122; 403/132; 403/133; 403/142
(58) Field of Classification Search ............ 403/56, 403/76, 90, 114, 115, 122, 132, 133, 135, 403/136, 137, 138, 141–143
See application file for complete search history.

(56) References Cited

U.S. PATENT DOCUMENTS

| | | | |
|---|---|---|---|
| 3,275,313 A | | 9/1966 | Hoenick |
| 3,329,454 A | * | 7/1967 | Melton et al. ............ 403/135 |
| 4,568,216 A | * | 2/1986 | Mizusawa et al. ......... 403/143 |
| 4,954,006 A | | 9/1990 | Suzuki et al. |
| 5,112,031 A | | 5/1992 | Hynds et al. |
| 5,165,306 A | | 11/1992 | Hellon |
| 5,562,357 A | | 10/1996 | Sandell |
| 5,807,010 A | | 9/1998 | Parker et al. |
| 5,876,148 A | | 3/1999 | Kraps |
| 5,885,022 A | * | 3/1999 | Maughan et al. .......... 403/135 |
| 6,007,080 A | | 12/1999 | Kincaid et al. |
| 6,190,080 B1 | * | 2/2001 | Lee .......................... 403/135 |
| 6,206,604 B1 | | 3/2001 | Dembowsky et al. |
| 6,254,114 B1 | | 7/2001 | Pulling et al. |
| 6,533,490 B1 | * | 3/2003 | Kincaid et al. ............ 403/133 |

* cited by examiner

*Primary Examiner*—Daniel P. Stodola
*Assistant Examiner*—Victor MacArthur
(74) *Attorney, Agent, or Firm*—John Kajander

(57) ABSTRACT

A low insertion force snap together automotive coupler for the suspension of a vehicle includes a spherical bearing insert having a first end, a second end, a pocket adapted to engage a ball stud that is integrally formed onto a suspension component, and an axially extending annular flange. The coupler further includes a receiver adapted to receive the spherical bearing insert after the spherical bearing insert has been placed to a ball stud and to engage the flange to secure the spherical bearing insert within the receiver. The pocket within the spherical bearing insert is shaped such that an axial force tending to pull the ball stud out of the pocket will result in a radial force exerted upon the flange, thereby causing additional force to keep the flange engaged within the receiver.

8 Claims, 2 Drawing Sheets

SNAP TOGETHER AUTOMOTIVE COUPLER

TECHNICAL FIELD

The present invention generally relates to stabilizer bar for an automotive vehicle having a coupler that connects the stabilizer bar to other components of the suspension system of the vehicle.

BACKGROUND

Stabilizer bar systems are designed to provide resistance to roll between the suspension and the body of an automobile during differentiated, or side to side, wheel travel. Typically, the stabilizer bar is connected to the body of the vehicle through isolating bushings and the ends of the stabilizer bar are connected to the suspension of the vehicle through various types of articulating end links. These end links require additional components, such as threaded fasteners to secure the ends of the stabilizer bar to the suspension. One efficient type of articulating connection is a ball stud. However, many of the advantages realized by using a ball stud type connection are usually off set by increased system cost, complexity, and packaging limitations.

Therefore, there is a need for a stabilizer bar system having a ball stud type connection to the suspension of an automotive vehicle which provides easy assembly, a reduction in the number of components, and increased packaging options.

SUMMARY

The disadvantages of the prior art are overcome by providing a low insertion force snap together automotive coupler for the suspension of a vehicle, wherein the spherical ball stud is incorporated into the manufacture of the suspension component, having a spherical bearing insert with a first end, a second end, a pocket adapted to frictionally engage a ball stud, and an axially extending annular flange, and a receiver that is adapted to receive the spherical bearing insert after the spherical bearing insert has been placed to a ball stud and to engage said flange to secure said spherical bearing insert within said receiver.

The pocket within the spherical bearing insert is shaped such that an axial force tending to pull the ball stud out of the pocket will result in a radial force exerted upon the flange, thereby causing additional force to engage the flange and the receiver to keep the flange interlocked within the receiver.

DETAILED DESCRIPTION OF THE PREFERRED EMBODIMENTS

The following description of the preferred embodiment of the invention is not intended to limit the scope of the invention to the preferred embodiment, but rather to enable any person skilled in the art to make and use the invention.

Figure 1:
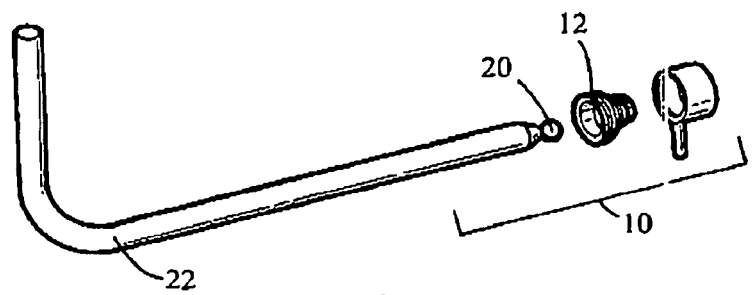
FIG. 1 is an exploded view of a stabilizer bar, spherical bearing insert, and receiver of the present invention.
Figure 2:
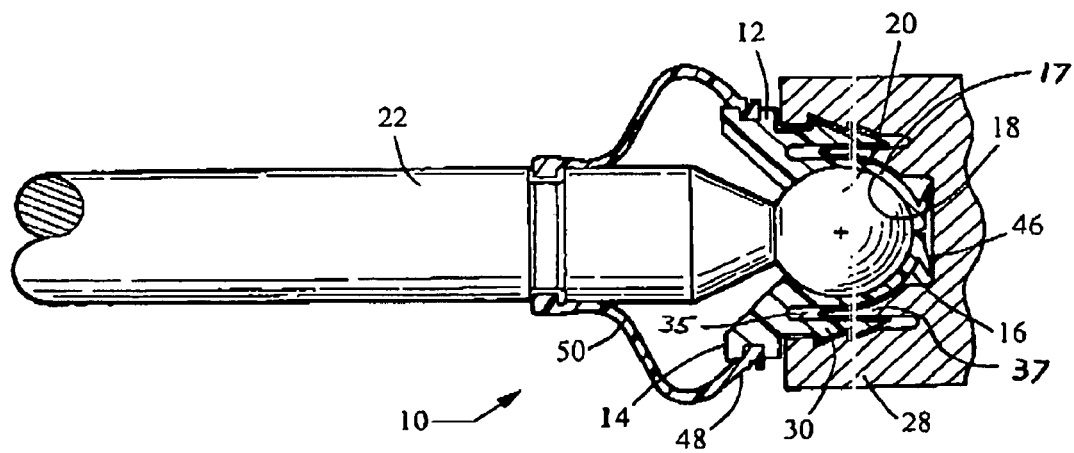
FIG. 2 is an side sectional view of an assembled stabilizer bar, spherical bearing insert, and receiver.

Referring to FIGS. 1 and 2, a coupler of the present invention is shown generally at 10. The coupler 10 includes a spherical bearing insert 12 having a first end 14 and a second end 16. A body portion 17 of the spherical bearing insert 12 defines a pocket 18 is formed within the spherical bearing insert 12 that is adapted to receive and frictionally engage a ball stud 20 at the end of a stabilizer bar 22. Preferably, the pocket 18 is generally spherical in shape and is sized to accommodate a ball stud 20 of substantially the same size and shape. with strength and resilience qualities appropriate for a given application.

Figure 3:
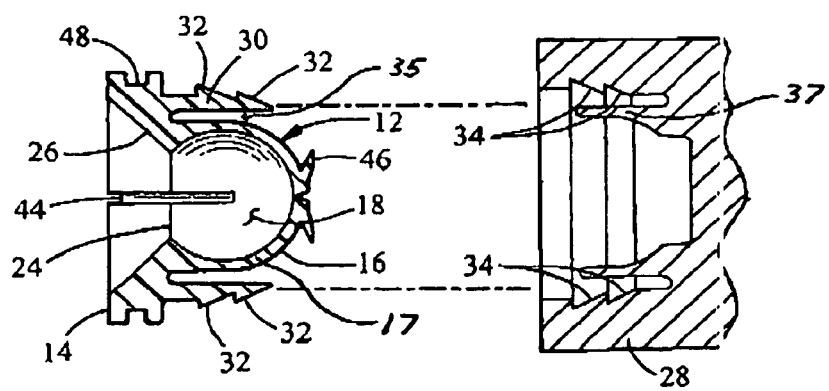
FIG. 3 is side sectional view of the spherical bearing insert and receiver.

Referring to FIG. 3, the spherical bearing insert 12 includes an orifice 24 through which the ball stud 20 is to be inserted into the pocket 18 and a conical opening 26 extending from the first end 14 to the orifice 24. The orifice 24 is sized smaller than the diameter of the pocket 18 such that when the ball stud 20 is inserted within the pocket 18 the spherical bearing insert 12 must deflect to allow the orifice 24 to enlarge sufficiently to allow the ball stud 20 to be received within the pocket 18. The spherical bearing insert 12 is made from a resilient material such that once the ball stud 20 has fully entered the pocket 18, the spherical bearing insert 12 and the orifice 24 will flex back thereby providing resistance to removal of the ball stud 20 from the pocket 18. Preferably, the spherical bearing insert 12 is made from a polymeric material, however the spherical bearing insert 12 can be made from other suitable materials with strength and resilience qualities appropriate for a given application.

The coupler 10 further includes a receiver 28 which receives and holds the spherical bearing insert 12. The receiver 28 is preferably made from a stiff material and is fixedly mounted to other components of the suspension (not shown) of the vehicle. The spherical bearing insert 12 includes an axially extending annular flange 30, spaced radially apart from the body portion 17, that has an outer surface with a plurality outwardly facing ramped ridges 32. The receiver 28 has an inner surface with a plurality of corresponding inwardly facing ramped notches 34. The body portion 17 and the flange 30 of the spherical bearing insert define an annular groove 35 extending around the body portion 17 between the body portion 17 and the flange 30. The receiver 28 further includes an axially extending annular flange spaced radially inward from the inwardly facing ramped notches 34.

The ramped notches 34 and the ramped ridges 32 are angled relative to one another such that the spherical bearing insert 12 can be easily inserted within the receiver 28, whereby the flange 30 of the spherical bearing insert 12 will deflect inward until the ramped ridges 32 snap into the ramped notches 34. The ramped ridges are oriented in a "Christmas tree" like formation such that when the ramped ridges 32 snap into the ramped notches 34, the ramped notches 34 will frictionally engage the ramped ridges 32 and prevent the spherical bearing insert 12 from being removed from the receiver 28. The flange 37 of the receiver 28 is received within the groove 35 between the flange 30 and the body portion 17 of the spherical bearing insert 12, thereby preventing the flange 30 of the spherical bearing insert 12 from deflecting inward, thus keeping the ridges 32 of the flange 30 of the spherical bearing insert 12 engaged with the notches 34 of the receiver 28.

Figure 4:
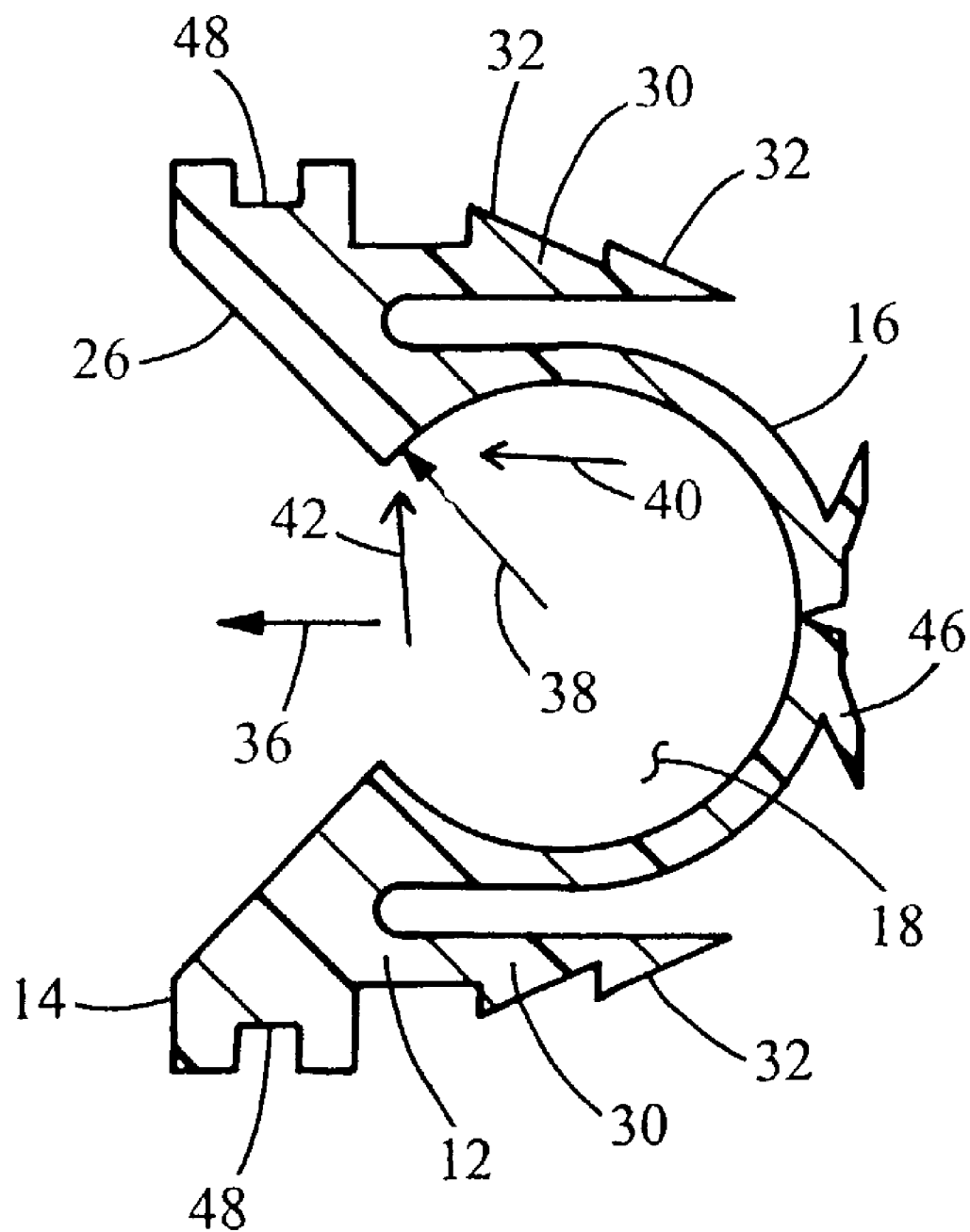
FIG. 4 is a side sectional view of the spherical bearing insert similar to FIG. 3 showing forces applied to the spherical bearing insert.

Referring to FIG. 4, when an axial force 36 acts to pull the spherical bearing insert 12 from the pocket 18, the ball stud 20 exerts a force 38 against an inner surface of the pocket 18. This force 38 resolves into a horizontal component 40 that acts in the axial direction and a vertical component 42 that acts in the radial direction. The force of the vertical component 42 acts to deflect the spherical bearing insert 12 outward radially. This outward radial push adds more pressure to the flange 30 which places more outward radial pressure onto the ramped ridges 32, thereby helping to keep the ramped ridges 32 of the flange 30 engaged with the ramped notches 34 of the receiver 28. Therefore, an axial force tending to pull the stabilizer bar 22 from the receiver 28 will only serve to further keep the spherical bearing insert 12, and thereby the stabilizer bar, engaged with the receiver 28.

Referring again to FIG. 3, preferably, the spherical bearing insert 12 includes at least one axial slot 44. The slot 44 extends from the first end 14 to a point approximately half way across the pocket 18. The slot increases the compliant behavior within the spherical bearing insert 12 that will allow the spherical bearing insert 12 to more easily deflect when a ball stud 20 is being inserted within the pocket 18. As shown, the spherical bearing insert 12 includes a single slot 44, however, it is to be understood, that the spherical bearing insert 12 could include more than one slot 44.

Preferably, the spherical bearing insert 12 includes a resilient spring feature 46 extending from the second end 16. Referring to FIGS. 2 and 3, the resilient spring feature 46 extends from the second end 16 of the spherical bearing insert 12 to engage an inner surface 29 of the receiver 28. As shown in the Figures the spring feature 46 comprises a cup like protrusion extending from the second end 16 of the spherical bearing insert 12. The spring feature 46 can be molded from the same material along with the spherical bearing insert 12, or alternatively can be formed separately and attached onto the second end 16. The spring feature 46 will accommodate tolerance variations within the receiver 28 and the spherical bearing insert 12 which will reduce the amount of axial backlash between the receiver 28 and the spherical bearing insert 12.

Once the end of the stabilizer bar 22 has been inserted within the spherical bearing insert 12, it is desirable to keep contamination from getting into the coupler 10. Preferably, the spherical bearing insert 12 includes a seal groove 48 facing radially outward and extending annularly about the spherical bearing insert 12 adjacent the first end 14. A seal 50 can be positioned within the seal groove 48 that will extend axially away from the first end 14 of the spherical bearing insert 12 and attach to the stabilizer bar 22. The seal 50 will seal the first end 14 of the spherical bearing insert 12 from the environment once a ball stud 20 has been inserted.

The foregoing discussion discloses and describes the preferred embodiment of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

We claim:

1. A low insertion force snap together automotive coupler for the suspension of a vehicle comprising:

a spherical bearing Insert having a first end, a second end, a body portion defining a pocket adapted to engage a ball stud that is integrally formed onto the end of a suspension component, and an axially extending annular flange spaced radially apart from the body portion, thereby defining an annular groove extending around said body portion between said body portion and said flange, said flange including an outer surface having a plurality of outwardly facing ramped ridges extending annularly thereabout; and a receiver adapted to receive said spherical bearing insert after said spherical bearing insert has been placed to a ball stud, said receiver including an liner surface having a plurality of inwardly facing ramped notches extending annularly thereabout, and an axially extending annular flange spaced radially inward from said inwardly facing ramped notches, said inwardly facing ramped notches engaging said outwardly facing ramped ridges of said flange of said spherical bearing insert, and said flange of said inner surface of said receiver being received within said groove between said body portion and said flange of said spherical bearing insert;

said ramped notches and said ramped ridges being angled relative to one another such that upon axial insertion, said flange is adapted to deflect inward until said ramped ridges snap into engagement with said ramped notches, thereby preventing said spherical bearing insert from being axially pulled from said receiver and securing said spherical bearing insert within said receiver;

said pocket within said spherical bearing insert being shaped such that an axial force tending to pull the ball stud out of said pocket will result in a radial force exerted upon said flange, thereby causing additional force to keep said flange engaged within said receiver.

2. The coupler of claim 1 wherein said pocket is generally spherical in shape and is adapted to accommodate a ball stud of substantially the same size and shape.

3. The coupler of claim 2 wherein said spherical bearing insert includes an orifice through which the ball stud is to be inserted into said pocket, and a conical opening extending from said first end to said orifice, said orifice being sized smaller than said pocket such that when the ball stud is inserted within said pocket said spherical bearing insert must deflect to allow said orifice to enlarge sufficiently to allow the ball stud to be received within said pocket, and once the ball stud has fully entered said pocket, said spherical bearing insert and said orifice will flex back thereby providing resistance to removal of the ball stud from said pocket.

4. The coupler of claim 3 wherein said spherical bearing insert includes at least one axial slot formed therein extending from said first end to a point half way across said pocket, said slot being adapted to allow said spherical bearing insert to more easily deflect when a ball stud is being inserted within said pocket.

5. The coupler of claim 1 wherein said spherical bearing insert includes resilient spring features extending from said second end, said spring features engaging an inner surface of said receiver to accommodate tolerance variations within said receiver and said spherical bearing insert and to reduce axial backlash between said receiver and said spherical bearing insert.

6. The coupler of claim 1 wherein said spherical bearing insert is made from a polymeric material.

7. The coupler of claim 1 wherein said spherical bearing insert further includes a seal groove facing radially outward and extending annularly about said spherical bearing insert adjacent said first end.

8. The coupler of claim 7 further including a seal positioned within said seal groove and extending axially away from said first end, said sea adapted to seal said first end of said spherical bearing insert from the environment once a ball stud has been inserted.

* * * * *